US010193425B2

(12) United States Patent
Yamamoto et al.

(10) Patent No.: US 10,193,425 B2
(45) Date of Patent: Jan. 29, 2019

(54) STEPPING MOTOR, TIMEPIECE MOVEMENT, TIMEPIECE, AND MANUFACTURING METHOD OF STEPPING MOTOR

(71) Applicant: SEIKO INSTRUMENTS INC., Chiba-shi, Chiba (JP)

(72) Inventors: Kosuke Yamamoto, Chiba (JP); Shinji Kinoshita, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 265 days.

(21) Appl. No.: 14/997,714

(22) Filed: Jan. 18, 2016

(65) Prior Publication Data

US 2016/0209812 A1 Jul. 21, 2016

(30) Foreign Application Priority Data

Jan. 20, 2015 (JP) ................................. 2015-008886
Oct. 20, 2015 (JP) ................................. 2015-206547

(51) Int. Cl.

| | |
|---|---|
| ***H02K 37/00*** | (2006.01) |
| ***H02K 15/02*** | (2006.01) |
| ***G04C 3/14*** | (2006.01) |
| ***H02K 37/16*** | (2006.01) |
| ***H02K 1/02*** | (2006.01) |
| ***H02K 1/04*** | (2006.01) |
| ***H02K 15/12*** | (2006.01) |

(52) U.S. Cl.

CPC ............... *H02K 15/02* (2013.01); *G04C 3/14* (2013.01); *H02K 1/02* (2013.01); *H02K 1/04* (2013.01); *H02K 15/12* (2013.01); *H02K 37/16* (2013.01)

(58) Field of Classification Search

CPC ........ H02K 37/00; H02K 37/16; H02K 15/02; H02K 15/12; H02K 1/02; H02K 1/04
See application file for complete search history.

(56) References Cited

U.S. PATENT DOCUMENTS

| | | | | |
|---|---|---|---|---|
| 4,277,704 A * | 7/1981 | Giger | G04C 15/00 | 310/162 |
| 6,548,922 B1 * | 4/2003 | Takahashi | G04C 13/11 | 310/49.33 |
| 2015/0092522 A1 * | 4/2015 | Saito | H02K 21/185 | 368/80 |
| 2017/0108833 A1 * | 4/2017 | Yamamoto | G04C 3/14 | |

OTHER PUBLICATIONS

Abstract, Publication No. 59-136060, Publication Date Aug. 4, 1984.

* cited by examiner

*Primary Examiner* — Dang Le
(74) *Attorney, Agent, or Firm* — Adams & Wilks

(57) ABSTRACT

A stepping motor includes a one-piece stator integrally molded by using a Fe—Ni alloy plate through machining, a rotor accommodating through-hole, and in which a magnetic path is disposed around the rotor accommodating through-hole. A rotor is rotatably arranged inside the rotor accommodating through-hole. A magnetic core is connected to the stator, and a coil is wound on the magnetic core. A Cr-diffusion region having a molten-solidified portion of Cr is diffused in the Fe—Ni alloy stator in a portion of the magnetic path.

11 Claims, 13 Drawing Sheets

105 205 206 210 213 $\theta_0$ A 203 202 201 N S $\theta_1$ 214 211 204 207 208 209 i OUT1 OUT2

STEPPING MOTOR, TIMEPIECE MOVEMENT, TIMEPIECE, AND MANUFACTURING METHOD OF STEPPING MOTOR

BACKGROUND OF THE INVENTION

Field of the Invention

The present invention relates a stepping motor, a timepiece movement, a timepiece, and a manufacturing method of a stepping motor.

Background Art

In the related art, an analog electronic timepiece has been used in which a motor drive device rotatably drives an indicating hand such as an hour hand and a minute hand. The motor drive device has a stepping motor for rotatably driving the indicating hand and driving means for rotatably driving the stepping motor.

The stepping motor has a stator which has a positioning portion (inner notch) for determining a stop position of a rotor accommodating through-hole and a rotor, the rotor which is rotatably arranged inside the rotor accommodating through-hole, a magnetic core which comes into contact with the stator, and a coil which is wound around the magnetic core.

A configuration is adopted in which drive pulses having different polarities are alternately supplied from a drive circuit to the coil so as to cause the stator to alternately generate magnetic leakage fluxes having different polarities. In this manner, the stepping motor, that is, the rotor is rotated by every angle of 180 degrees in a predetermined one direction (forward direction), and the rotor is stopped at a position corresponding to the positioning portion.

In general, in order to easily obtain the magnetic leakage flux for rotating the rotor, an integrated stator is used which has a narrow portion whose width is narrowed at two locations (apart from each other by an angle of 180 degrees) around the rotor accommodating through-hole formed to arrange the rotor so that the narrowed portion is easily saturated with magnetic flux.

As a technique used in order to easily obtain the magnetic leakage flux for driving the rotor, a so-called dually integrated stator is known. In the dually integrated stator, the stator is first cut and divided into two at two locations (apart from each other by an angle of 180 degrees) around the rotor accommodating through-hole so as to minimize a cross-sectional area of a magnetic path. The cut portion is welded and joined after a slit material formed of a low magnetic permeability material or a non-magnetic material is inserted into the cut portion so as to decrease magnetic permeability of the narrow portion (refer to JP-B-5-56109).

However, the technique in the related art has residual tasks in the following points.

In a case of the above-described integrated stator in which the narrow portion is formed at two locations around the rotor accommodating through-hole, a principle of driving the rotor is that the narrow portion is first saturated with the magnetic flux and the stator is magnetically divided into two magnetic pole pieces. Thereafter, the magnetic leakage flux flows to the rotor so as to rotate the rotor. That is, the magnetic flux generated from the coil when a current is supplied is consumed by the narrow portion (power is consumed in order to saturate the narrow portion with the magnetic flux), thereby causing a problem of magnetic flux loss in the narrow portion.

Since the narrow portion is present, the magnetic flux generated from the rotor itself is consumed by the narrow portion. Thus, it becomes difficult to obtain a peak of magnetic potential, thereby degrading a retaining force for magnetically stopping and retaining the rotor. As a result, there is a possibility that an operation for stopping the rotor at a position corresponding to the positioning portion may be unstably performed, or that the rotor may be rotated (stepped-out) beyond an angle of 180 degrees.

According to the technique disclosed in JP-B-5-56109, the stator is divided into two pieces by means of machining, and thereafter the two pieces are joined to each other by means of welding. Thus, mechanical stress, distortion during the welding process, or misalignment of members is likely to occur. For this reason, there is a problem of an error occurring in a distance between the rotor and the stator. Consequently, there is a problem in that disadvantages such as a misaligned stop position of the rotor and inaccurate rotation are likely to occur.

If an outer shape of the stator is distorted, the stator is no longer flat. Thus, a contact area between the coil and the stator is likely to decrease, or mutual positions between the rotor and the stator are likely to be misaligned with each other. As a result, there is a possibility of poor magnetic efficiency or damage to the stator during an assembly process, thereby leading to poor quality products.

Therefore, the present invention is made in view of these circumstances, and an object thereof is to provide a stepping motor, a timepiece movement, a timepiece, and a manufacturing method of a stepping motor, in which power consumption can be reduced (power saving) and which can improve stability of a rotor rotatably driven by using a high retaining force.

SUMMARY OF THE INVENTION

The present inventors have intensively studied solutions for the above-described problems. As a result, it was found that the power consumption is reduced and the retaining force can be improved in such a way that a Cr-diffusion region having a molten-solidified portion of Cr serving as a non-magnetic material is formed in a portion of a magnetic path disposed around a rotor accommodating through-hole so as to decrease permeability in the region.

The gist of the present invention which was obtained through the study is as follows.

[1] A stepping motor includes a stator that is molded by using an integrated Fe—Ni alloy, that has a rotor accommodating through-hole, and in which a magnetic path is disposed around the rotor accommodating through-hole, a rotor that is rotatably arranged inside the rotor accommodating through-hole, and a coil that is disposed in the stator. A Cr-diffusion region having a molten-solidified portion of Cr is formed in a portion of the magnetic path.

In the stepping motor according to [1], a non-magnetic region brought into an austenitic single phase by Cr being melted and diffused is formed in a portion of the magnetic path disposed around the rotor accommodating through-hole. Accordingly, it is possible to reduce permeability in the region. As a result, magnetic flux consumed in the region can be considerably reduced. Therefore, magnetic leakage flux for driving the rotor can be efficiently secured, and power saving can be achieved.

In the stepping motor according to [1], since the permeability is reduced in the Cr-diffusion region, the magnetic flux generated from the rotor itself is also restrained from being consumed in the region, and it is possible to prevent a loss of magnetic potential. Therefore, it is possible to increase a retaining force for magnetically stopping and retaining the rotor, and it is possible to improve stability of the rotor which is rotatably driven.

In the integrated stator in the related art, it is necessary that the rotor is rotated using one polarity and then is rotated using the other polarity. In this case, it is necessary to cancel residual magnetic flux of the narrow portion, to saturate the narrow portion with the magnetic flux, and to magnetically divide the stator into two magnetic pole pieces. In particular, when a fast hand operation is performed, it is necessary not only to cancel the residual magnetic flux but also to complete the rotation of the rotor in a short period of time. However, in the stepping motor according to [1], the residual magnetic flux is considerably reduced in the region. Accordingly, it is possible to shorten the time required for canceling the residual magnetic flux. Therefore, it is possible to increase driving frequencies.

In the stepping motor according to [l], the stator is integrally formed as a structure. Accordingly, it is possible to avoid the occurrence of mechanical stress, distortion during a welding/joining process, or misalignment of members, which is a worrying factor when the dually integrated stator is manufactured in the related art. Therefore, it is possible to prevent magnetic inefficiency, damage to the stator, and poor quality products.

In the stepping motor according to [1], the stator is integrally formed. Accordingly, there is no welded portion or joined portion which is likely to receive concentrated mechanical stress. Therefore, it is possible to prevent strength from being weakened.

[2] In the stepping motor according to [1], a narrow portion formed so that a cross-sectional area of the magnetic path is narrower than that of other portions may be disposed in the stator, and the Cr-diffusion region may be formed in at least a portion of the narrow portion.

According to the invention of [2], the narrow portion is disposed in a portion of the magnetic path disposed around the rotor accommodating through-hole, and the Cr-diffusion region is formed in at least a portion of the narrow portion. Accordingly, it is possible to more efficiently secure the magnetic leakage flux for driving the rotor. Therefore, power consumption can be considerably reduced.

[3] In the stepping motor according to [2], the molten-solidified portion may include the narrow portion, and may be disposed in a section which does not interfere with a cut-out portion disposed in the rotor accommodating through-hole in order to secure a stable position of the rotor.

According to the invention of [3], there is no possibility that the molten-solidified portion may be hindered from functioning to secure a stable position for rotation control of the rotor.

[4] In the stepping motor according to any one of [1] to [3], the Cr-diffusion region may contain 15 mass % to 80 mass % of Cr.

According to the invention of [4], it is possible to considerably reduce the permeability of the Cr-diffusion region.

[5] In the stepping motor according to [4], the Cr-diffusion region may contain 18 mass % to 55 mass % of Cr.

According to the invention of [5], it is possible to considerably reduce the permeability of the Cr-diffusion region.

[6] A timepiece movement includes the stepping motor according to any one of [1] to [5] and a hand that is rotated by the stepping motor so as to indicate time.

[7] A timepiece includes the timepiece movement according to [6].

According to the invention of [6] and [7], the stepping motor is provided which not only realizes power saving but also has a high retaining force. Accordingly, it is possible to provide the time piece movement and the timepiece which have excellent magnetic properties.

[8] A manufacturing method of the stepping motor according to anyone of [1] to [5] includes machining an Fe—Ni alloy plate and forming a stator material which has a rotor accommodating through-hole and a magnetic path arranged around the rotor accommodating through-hole, arranging a Cr-material for diffusion in at least a portion of the stator material, and emitting a laser beam to the Cr-material, melting and solidifying the Cr-material into the magnetic path, and forming a Cr-diffusion region having a molten-solidified portion of Cr.

According to the invention of [7], the stator is integrally formed. Accordingly, there is no possibility of mechanical stress due to cutting, distortion during a welding/joining process, or misalignment of members. Therefore, it is possible to prevent magnetic inefficiency, damage to the stator, poor quality products, and weakened strength. Moreover, the Cr-material is melted and diffused in at least a portion of the stator material, thereby reducing the permeability. Therefore, it is possible to easily manufacture the stepping motor which not only realizes power saving but also has a high retaining force.

In the related art, when a region of low permeability is adjusted, it is necessary to greatly change or adjust manufacturing conditions such as processing methods or conditions of mechanically dividing the stator and adjustment of a non-magnetic material to be inserted. As a result, there is a possibility of an increase in the manufacturing cost. However, according to the invention of [7], the stator material does not need processing such as cutting. The Cr-diffusion region (low permeability region) can be desirably adjusted by only adjusting a condition for emitting a laser beam.

[9] In the manufacturing method of the stepping motor according to [8], the arranging of the Cr-material may be coating at least a portion of the magnetic path with a paste containing powdered metallic chromium.

[10] In the manufacturing method of the stepping motor according to [8], the arranging of the Cr-material may be forming a chromium plating layer on a surface of the stator material. In the melting of the Cr-material, the Cr-material may be melted by emitting the laser beam to the chromium plating layer formed in at least a portion of the magnetic path, within the chromium plating layer formed on the surface of the stator material.

According to the invention of [9] and [10], it is possible to easily form the Cr-diffusion region.

[11] In the manufacturing method of the stepping motor according to any one of [8] to [10], in the forming of the stator material, a narrow portion in which a cross-sectional area of the magnetic path is narrower than that of other portions may be disposed in the stator. In the arranging of the Cr-material, the Cr-material is arranged in a region including at least the narrow portion.

According to the invention of [11], the narrow portion is disposed in a portion of the magnetic path disposed around the rotor accommodating through-hole, and the Cr-diffusion region is formed in a region including at least the narrow portion. Accordingly, it is possible to manufacture the stepping motor which can more efficiently secure the magnetic leakage flux for driving the rotor, and which can considerably reduce power consumption.

According to the invention, it is possible to provide a stepping motor, a timepiece movement, a timepiece, and a manufacturing method of a stepping motor, in which power consumption can be reduced (power saving) and which can improve stability of a rotor rotatably driven by using a high retaining force.

DETAILED DESCRIPTION OF THE INVENTION

Hereinafter, a stepping motor, a timepiece movement, a time piece, and a manufacturing method of a stepping motor will be described with reference to the drawings.

The following drawings are illustrated in order to describe configurations of the stepping motor according to an embodiment of the present invention. Dimensions such as sizes and thicknesses of each illustrated unit have a different relationship with dimensions of an actual stepping motor in some cases.

Figure 1:
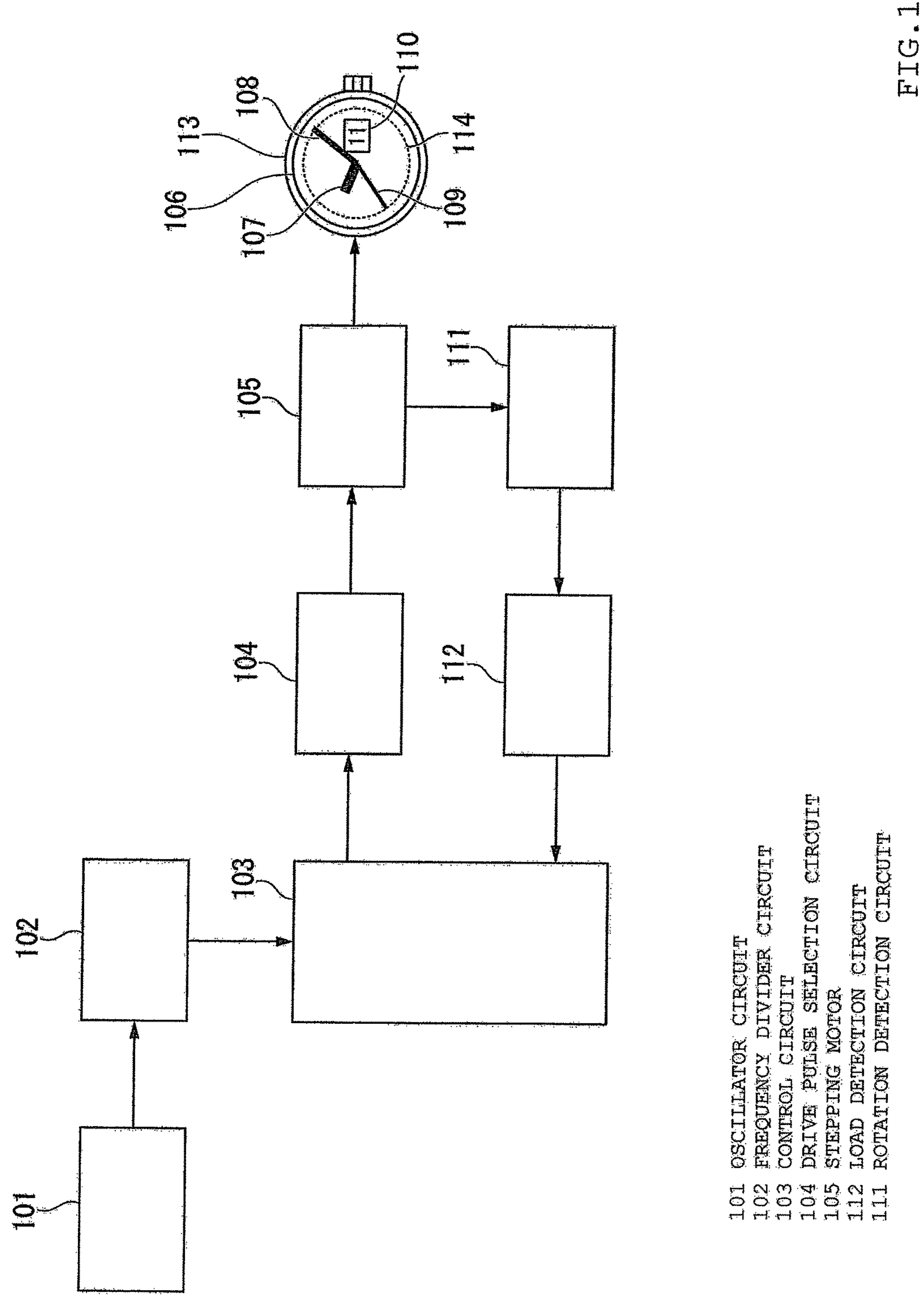
FIG. 1 is a common block diagram of a stepping motor, a stepping motor drive device, a timepiece movement, and a timepiece according to the present embodiment.

FIG. 1 is a block diagram illustrating a timepiece using the stepping motor and the timepiece movement according to the embodiment of the present invention. In the present embodiment, an analog electronic timepiece will be described as an example of the timepiece.

In FIG. 1, the analog electronic timepiece includes an oscillator circuit 101 which generates a signal having a predetermined frequency, a frequency divider circuit 102 which generates a clocking reference signal for a timepiece by dividing the signal generated by the oscillator circuit 101, a control circuit 103 which performs control such as control for each electronic circuit element configuring the analog electronic timepiece and change control for drive pulses, a drive pulse selection circuit (driving means) 104 which selects and outputs a drive pulse for rotatably driving a motor, based on a control signal from the control circuit 103, a stepping motor 105 which is rotatably driven by the drive pulse output from the drive pulse selection circuit 104, a rotation detection circuit 111 which serves as detecting means for detecting a detection signal generated by the stepping motor 105, a train wheel (not illustrated) which is rotatably driven by the stepping motor 105, time indicating hands (three types of an hour hand 107, a minute hand 108, and a second hand 109 in an example illustrated in FIG. 1) which are rotatably driven by the train wheel and provided for indicating the time, and an analog display unit 106 which has a calendar display unit 110 for date display.

A stepping motor driving device according to the present embodiment is configured to include the stepping motor 105, the device control circuit 103, the drive pulse selection circuit 104, and the rotation detection circuit 111.

The analog electronic timepiece includes a timepiece case 113. The analog display unit 106 is arranged on an outer surface side of the timepiece case 113. A timepiece movement (movement) 114 is arranged inside the timepiece case 113.

The oscillator circuit 101, the frequency divider circuit 102, the control circuit 103, the drive pulse selection circuit 104, the stepping motor 105, and the rotation detection circuit 111 are configuration elements of the movement 114.

In general, a mechanical body of the timepiece including a power source of the timepiece and a time reference device is called the movement. An electronic movement is called a module in some cases. In a finished state of the timepiece, a dial and hands are attached to the movement, and are accommodated in the timepiece case.

Here, the oscillator circuit 101 and the frequency divider circuit 102 configure a signal generation unit, and the analog display unit 106 configures a time display unit. The rotation detection circuit 111 and the load detection circuit 112 configure a rotation detection unit. The control circuit 103 and the drive pulse selection circuit 104 configure a control unit. The oscillator circuit 101, the frequency divider circuit 102, the control circuit 103, the drive pulse selection circuit 104, the rotation detection circuit 111, and the load detection circuit 112 configure a stepping motor control circuit.

Next, the stepping motor 105 according to the present embodiment will be described.

Figure 2:
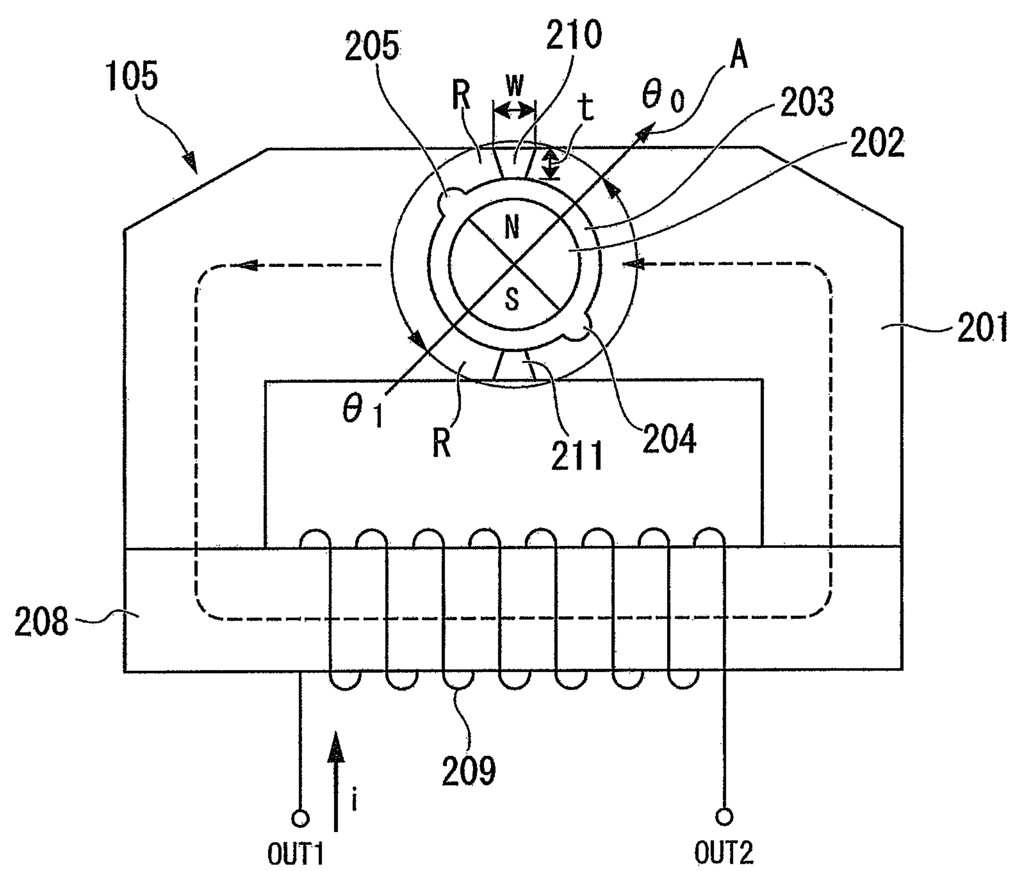
FIG. 2 is a schematic front view of the stepping motor according to the present embodiment.

FIG. 2 is a schematic front view of the stepping motor 105 according to the present embodiment.

In FIG. 2, the stepping motor 105 includes a stator 201 that is integrally molded by using an Fe—Ni alloy plate through machining, that has a rotor accommodating through-hole 203, and in which a magnetic path R is disposed around the rotor accommodating through-hole 203, a two pole rotor 202 that is rotatably arranged inside the rotor accommodating through-hole 203, a magnetic core 208 that is joined to the stator 201, and a coil 209 that is wound around the magnetic core 208. In the stepping motor 105 according to the present embodiment, Cr-diffusion regions 210 and 211 having a molten-solidified portion of Cr are formed in a portion of the magnetic path R.

When the stepping motor 105 is used for the analog electronic timepiece, the stator 201 and the magnetic core 208 are fixed to a main plate (not illustrated) by using screws (not illustrated), and are joined to each other. The coil 209 has a first terminal OUT1 and a second terminal OUT2.

The rotor accommodating through-hole 203 is configured to have a circular hole shape in which multiple (two in an example in FIG. 2) semicircular cut-out portions (inner notches) 204 and 205 are integrally formed in a portion facing a through-hole having a circular contour. The cut-out portions 204 and 205 are configured to function as a positioning portion for determining a stop position of the rotor 202. For example, if the rotor 202 reaches a predetermined position, potential energy of the cut-out portion (inner notch) 204 decreases, and the cut-out portion 204 functions to stabilize a position of the rotor 202.

The rotor 202 is magnetized into two poles (S-pole and N-pole).

In a state where the coil 209 is not energized, the rotor 202 stably stops at a position corresponding to the positioning portion as illustrated in FIG. 2. In other words, a magnetic pole axis A of the rotor 202 stably stops at a position (position of an angle θ0) which is orthogonal to a line segment connecting the cut-out portions 204 and 205 to each other.

The Cr-diffusion regions 210 and 211 having the molten-solidified portion of Cr which is a non-magnetic material are formed in a portion (two locations in an example in FIG. 2) of the magnetic path R disposed around the rotor accommodating through-hole 203. Here, the width of a cross section of the narrow portion in the stator 201 is set to a cross-sectional width t, and the width in the direction along the magnetic path R is set to a gap width w. The molten-solidified portions 210 and 211 are formed in a region defined by the cross-sectional width t and the gap width w. Due to a manufacturing method of the molten-solidified portion (to be described later), the gap width w is formed to be equal to or greater than the cross-sectional width t (wt). The molten-solidified portions 210 and 211 are formed in a region which does not interfere with the cut-out portion (inner notch) 204 to some extent, so as not to be hindered from functioning to secure a stable position for rotation control of the rotor 202. The cross-sectional width t is defined as a width having a size which does not include Cr for coating or plating on a stator base material in the manufacturing method of the molten-solidified portion (to be described later). The gap width w is defined as a width having a size on a surface on which Cr for coating or plating comes into contact with the stator base material.

Here, an operation of the stepping motor 105 according to the present embodiment will be described.

First, a drive pulse is supplied to the terminals OUT1 and OUT2 (for example, the first terminal OUT1 side is set to a cathode, and the second terminal OUT2 side is set to an anode) of the coil 209 from the drive pulse selection circuit 104. If a current i flows in an arrow direction in FIG. 2, magnetic flux is generated in the stator 201 in a broken line arrow direction.

According to the present embodiment, the Cr-diffusion regions 210 and 211 which are low permeability regions are formed at the location which functions as the "narrow portion" in the related art, thereby increasing magnetic resistance in the region. Therefore, the regions corresponding to the "narrow portion" in the related art (Cr-diffusion regions 210 and 211) are not necessarily subjected to magnetic saturation, and magnetic leakage flux can be easily secured. Thereafter, interaction between a magnetic pole generated in the stator 201 and a magnetic pole of the rotor 202 causes the rotor 202 to rotate by an angle of 180 degrees in the arrow direction illustrated in FIG. 2, and the magnetic pole axis stably stops at a position of an angle θ1.

The stepping motor 105 is rotatably driven, thereby causing a rotation direction (counterclockwise direction in FIG. 2) for performing a normal operation (hand operation, since each embodiment according to the present invention employs the analog electronic timepiece) to be a forward direction, and causing the opposite direction (clockwise direction) to be a rearward direction.

Next, a reversed polarity drive pulse is supplied to the terminals OUT1 and OUT2 of the coil 209 from the drive pulse selection circuit 104 (the first terminal OUT1 side is set to the anode, and the second terminal OUT2 side is set to the cathode so as to have the reversed polarity, compared to the previous driving). If the current flows in a direction opposite to the arrow direction in FIG. 2, the magnetic flux is generated in the stator 201 in a direction opposite to the broken line arrow direction.

Thereafter, since the Cr-diffusion regions 210 and 211 which are low permeability regions are formed similarly to the above-described configuration, the magnetic leakage flux can be easily secured. Therefore, the interaction between the magnetic pole generated in the stator 201 and the magnetic pole of the rotor 202 causes the rotor 202 to rotate by an angle of 180 degrees in the same direction (forward direction), and the magnetic pole axis stably stops at a position of an angle θ0.

Thereafter, signals (alternating signals) having different polarities are supplied to the coil 209 in this way, thereby repeatedly performing the above-described operation. Thus, the rotor 202 can continuously rotate by every angle of 180 degrees in the arrow direction.

In this manner, the Cr-diffusion regions 210 and 211 which are the low permeability regions are formed in a portion of the magnetic path around the rotor accommodating through-hole 203. Accordingly, the magnetic flux consumed in the region can be considerably reduced, and it is possible to efficiently secure the magnetic leakage flux for driving the rotor 202.

The low permeability is achieved by forming the Cr-diffusion regions 210 and 211 at the location which functions as the "narrow portion" in the related art, thereby also restraining the magnetic flux generated from the rotor 202 from being consumed in the region. As a result, it is possible to prevent a loss of magnetic potential. Therefore, it is possible to increase a retaining force for magnetically stopping and retaining the rotor.

In the related art, the location functioning as the "narrow portion" is saturated with the magnetic flux on the OUT1 side (anode), and is rotated. Thereafter, in order to rotate the region by using the magnetic flux on the OUT2 side (cathode), it is necessary to cancel the residual magnetic flux generated on the OUT1 side (anode). However, since the residual magnetic flux is considerably reduced in the region, the time required for cancelling the residual magnetic flux is no longer needed. Accordingly, it is possible to shorten the time needed until the rotation is converged. Therefore, a stable operation can be maintained when the fast hand operation is performed, and it is possible to increase driving frequencies.

The Cr-diffusion regions 210 and 211 can be formed through melting and diffusing by using a laser beam. However, a heat quantity added to the region by the laser emitting enlarges a range for melting and diffusing, thereby changing a diffusion amount of Cr. As output further increases, the Cr-diffusion regions 210 and 211 to be formed further increase.

Figure 3A:
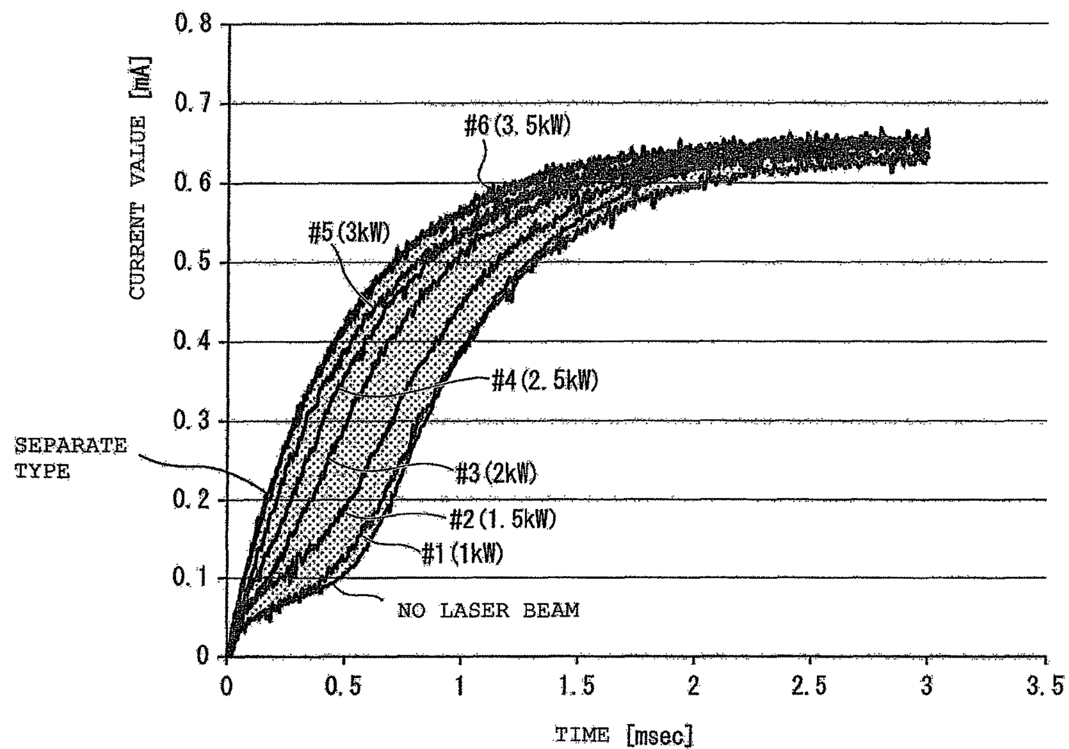
FIG. 3A is a graph (vertical axis: current value of coil (mA), horizontal axis: time (msec) illustrating a time-dependent change in a current value of a coil when outputting conditions of laser beam emitting are changed (volume of a Cr-diffusion region is changed).

FIG. 3A is a graph illustrating a time-dependent change in a current value of the coil by setting the vertical axis to be a current value (mA) of the coil 209 and the horizontal axis to be a time (msec)) when outputting conditions (written in parentheses in the graph) of laser beam emitting are changed, that is, when a volume of the Cr-diffusion regions 210 and 211 are changed. This graph is obtained by removing the rotor in order to check a saturated state by excluding the influence of the magnetic flux generated from the magnet of the rotor and using only the magnetic flux generated from the coil.

Figure 3B:
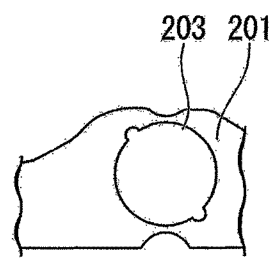
FIG. 3B is a schematic view of a stator in which a "narrow portion" in the related art is formed without melting and diffusing Cr.
Figure 3C:
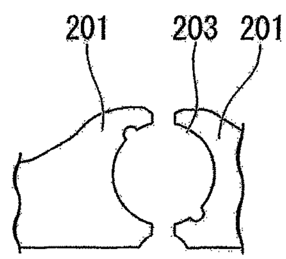
FIG. 3C is a schematic view of the stator which is divided into two pieces by cutting and machining the "narrow portion" in the related art.

As a comparative example of the present embodiment, an example in which Cr is melted without being diffused so as to form the "narrow portion" in the related art ("no laser beam" in the graph, refer to FIG. 3B) and an example in which the "narrow portion" in the related art is cut and processed so as to divide the stator into two pieces ("separate type" in the graph, refer to FIG. 3C) are illustrated together.

As illustrated in FIG. 3A, a current waveform of the "separate type" shows steep rising of a current value when the pulse is applied to the coil. On the other hand, a current waveform in a case of the "no laser beam" shows gentle rising. Thus, it is understood that power is consumed in order to magnetically saturate the "narrow portion".

If the current waveform in the example (samples #1 to #6) in which the Cr-diffusion regions 210 and 211 are formed is observed, the current waveform is shifted to the current waveform side of the "separate type" in accordance with an increase in output intensity (heat quantity) of the laser beam. That is, it is understood that a range of the molten-solidified portion is enlarged by locally adding heat, and that the Cr-diffusion regions 210 and 211 tend to have magnetic properties close to magnetic properties of the "separate type" as the Cr-diffusion regions 210 and 211 increase. The sample #1 shows application heat quantity of 0.4 J (output intensity of 1 kW), the sample #2 shows application heat quantity of 0.6 J (output intensity of 1.5 kW), the sample #3 shows application heat quantity of 0.8 J (output intensity of 2.5 kW), the sample #4 shows application heat quantity of 1.0 J (output intensity of 2.5 kW), the sample #5 shows application heat quantity of 1.2 J (output intensity of 3 kW), and the sample #6 shows application heat quantity of 1.4 J (output intensity of 3.5 kW). The output intensity of the laser beam represents output power (kW) of a heat source. An application heat quantity J is determined in view of an application period of time and aperture closing in addition to the output power.

From the above described-examples, it is understood that power consumption (filled area in the graph in FIG. 3A) needed to magnetically saturate the "narrow portion" in the stepping motor in the related art which has the "narrow portion" can be reduced (power saving) by forming the Cr-diffusion regions 210 and 211 in the region corresponding to the "narrow portion".

Figure 4A:
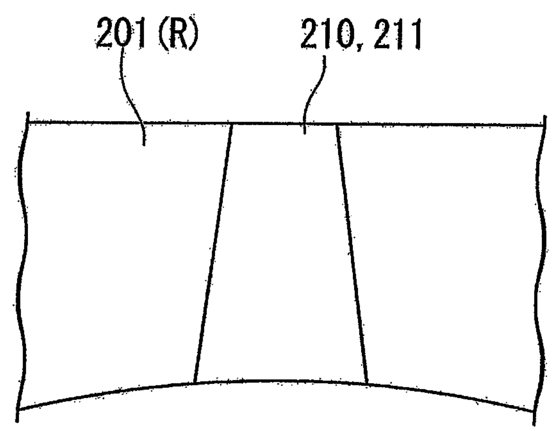
FIGS. 4A and 4B are schematic views for describing a form of the Cr-diffusion region.
Figure 4B:
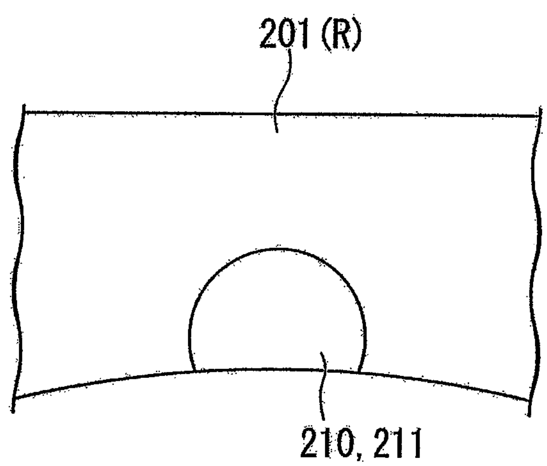

FIGS. 4A and 4B illustrate a schematically enlarged view illustrating the vicinity of the region where the Cr-diffusion regions 210 and 211 are formed.

As illustrated in FIG. 4A, the Cr-diffusion regions 210 and 211 may be formed in a region functioning as the "narrow portion" in the related art, that is, over the entire region from an end portion of the rotor accommodating through-hole 203 to an end portion of the stator 201. As illustrated in FIG. 4B, the Cr-diffusion regions 210 and 211 may be formed in a portion of the above-described region.

In a viewpoint of more efficiently securing the magnetic leakage flux for driving the rotor 202 (further reducing the above-described power consumption), it is desirable to form the Cr-diffusion regions 210 and 211 over the entire region from the end portion of the rotor accommodating through-hole 203 to the end portion of the stator 201 as illustrated in FIG. 4A. However, as illustrated by the graph in FIG. 3A, the above-described advantageous effect can be obtained even when the Cr-diffusion regions 210 and 211 are small, or even when the forming region of the Cr-diffusion regions 210 and 211 is only a portion of the region functioning as the "narrow region" in the related art.

Figure 5:
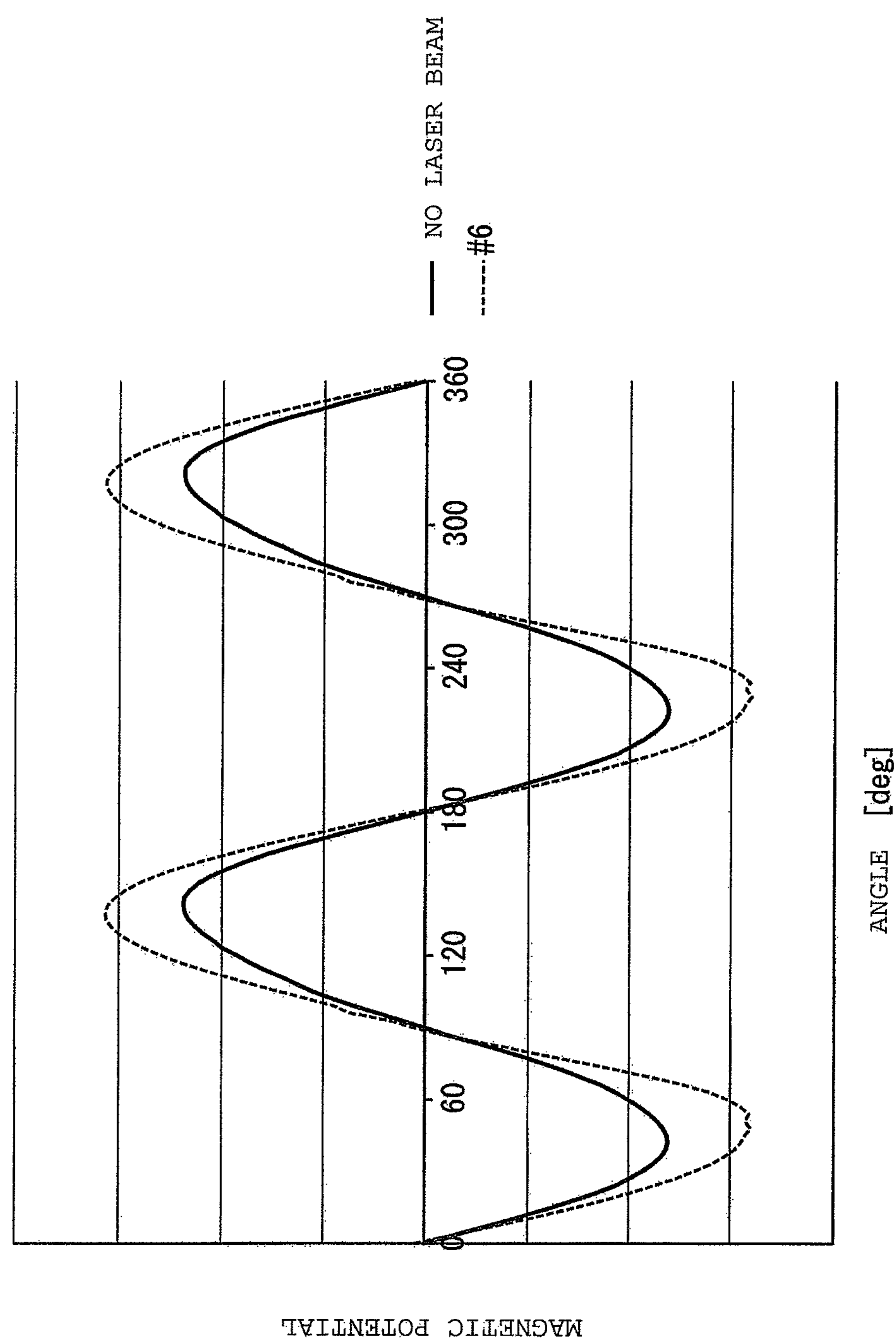
FIG. 5 is a schematic view for describing a state of magnetic potential depending on magnetic pole angles.

In FIG. 5, the horizontal axis represents an angle (deg) of the magnetic pole axis of the rotor 202, and the vertical axis represents magnetic potential (any unit may be used) so as to illustrate a change in torques in the two examples of "no laser beam" and "#6" which are illustrated in FIG. 3A.

An angle of the lowest magnetic potential indicates a static position, and an angle of the highest magnetic potential indicates a peak which the rotor has to cross whenever the rotor rotates. A peak difference between the angle of the highest and the angle of the lowest indicates a retaining force belonging to the rotor, and indicates those which correspond to a holding torque of the movement.

The stepping motor 105 according to the present embodiment includes the cut-out portions 204 and 205 so that the static position is an angle of 45°. Accordingly, the angle of 45° shows the lowest magnetic potential. In contrast, an angle of 135° shows the highest magnetic potential. If the rotor 202 cannot cross this angle, the rotor 202 is reversely rotated to the angle of 45° which is the static position. Consequently, a rotation force required for the hand operation of the timepiece cannot be obtained.

Referring to FIG. 5, Example #6 according to the present embodiment can confirm that a peak difference of the magnetic potential is higher than that in a case of "no laser beam" in the related art. FIG. 5 illustrates that the holding torque is high.

In a case of Example #6, since the narrow portion is a non-magnetic region, a behavior of the magnetic flux is changed, compared to a case of "no laser beam". That is, in the graph illustrated in FIG. 5, depending on a position or shape of the Cr-diffusion region, the cases of "#6" and "no laser beam" show behaviors which are slightly different from each other (angles at which the magnetic potential shows a peak are deviated from each other). However, in order to easily observe the above-described "peak difference" between "#6" and "no laser beam", that is, a change in holding torques of the movement, both cases are illustrated in this description so that angles at which the respective peaks are generated are coincident with each other.

Figure 6:
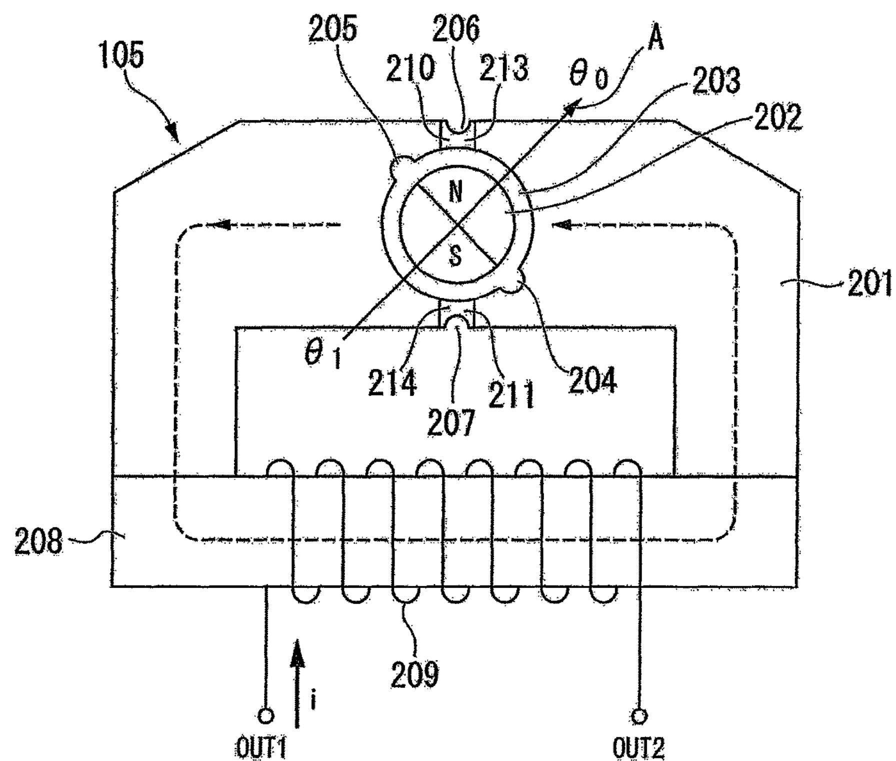
FIG. 6 is a schematic front view of the stepping motor according to the present embodiment.

As illustrated in FIG. 6, the stepping motor 105 according to the present embodiment may have narrow portions 213 and 214 formed so that the cross-sectional area of the magnetic path R is narrower than other portions. Unlike the "narrow portion" in the related art, the narrow portions 213 and 214 are formed in the Cr-diffusion regions 210 and 211. When the narrow portions 213 and 214 are provided, the Cr-diffusion regions 210 and 211 are formed in at least a portion of the narrow portions 213 and 214.

The narrow portions 213 and 214 are configured by forming cut-out portions (outer notches) 206 and 207 in an outer end portion of the stator 201 and at a facing position across the rotor accommodating through-hole 203. That is, the narrow portions 213 and 214 are formed between the respective outer notches 206 and 207 and the rotor accommodating through-hole 203.

Since the narrow portions 213 and 214 are provided, it is possible to more efficiently secure the magnetic leakage flux for driving the rotor. Therefore, power consumption can be considerably reduced.

The stepping motor 105 according to the present embodiment adopts a configuration in which Cr concentration of the Cr-diffusion regions 210 and 211 is higher than Cr concentration in the stator 201 formed from a Fe—Ni alloy plate. In this manner, it is possible to reduce permeability of the Cr-diffusion regions 210 and 211. In a viewpoint of reducing the permeability in the Cr-diffusion regions 210 and 211, it is desirable to set the Cr concentration of the Cr-diffusion regions 210 and 211 to be 15 mass % to 80 mass %.

Figure 14:
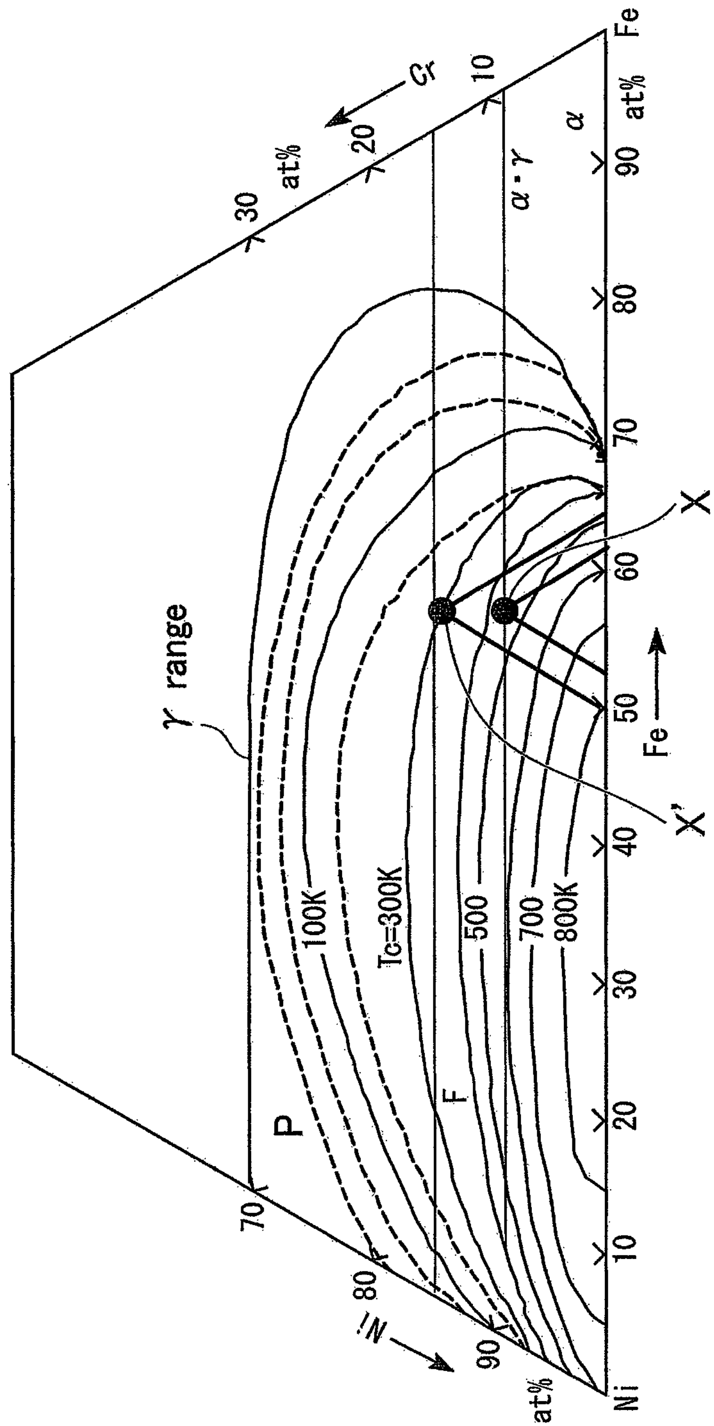
FIG. 14 is a view illustrating a state of an Fe—Ni—Cr ternary alloy.

In the stepping motor 105 according to the present embodiment, although the stator 201 is configured to include a Fe—Ni alloy, it is preferable to use the Fe—Ni alloy which has high permeability. For example, it is possible to use Cr containing Fe of 38% and Ni of 8% (so called 38 permalloy). Referring to a state view in FIG. 14, the Curie temperature of Cr containing Fe of 38% and Ni of 8% is 500K or greater (point X). However, when Cr is 15 mass % or greater, the Curie temperature becomes 300 K so that Cr is in an austenite phase at room temperature (point X'). That is, at approximately the room temperature required for driving the stepping motor 105, it is possible to ensure a non-magnetic state of the stator 201 when Cr is 15 mass % or greater. FIG. 14 is a view illustrating a state cited from page 188 of Ternary Alloys Between Fe, Co or Ni and Ti, V, Cr or Mn (Landolt-Bornstein new Series III/32A).

Hitherto, the stepping motor 105 according to the present embodiment has been described by citing an example of a two pole stator formed from one stator and one coil as illustrated in FIG. 2. However, as another form of the present embodiment, the present invention can also be applied to a stepping motor including a three pole stator formed from one stator and two coils.

The stepping motor including the three poles is known in that the rotor is stably operated while the rotation direction of the rotor is controlled.

Here, when the reverse rotation is realized by driving the rotor using a method of the two pole stator, a pulse for inducing the rotor to reach a predetermined position before a pulse for the reverse rotation is output is required in order to rotate the rotor in the opposite direction. Accordingly, an exciting section becomes two to three times or greater than an exciting section in a case of the forward direction. For this reason, there is a difference between frequencies which can be set for the rotation in the forward direction and the rotation in the opposite direction. Consequently, there is a disadvantage in that the rotation in the opposite direction is slow. However, the three pole stator is employed so as to rotate the rotor after a pulse for determining the rotation direction is supplied. Therefore, there is an advantage in that the hand operation can be performed by using the same pulse form and frequency for the rotation in the forward direction and the rotation in the opposite direction.

However, since the three pole stator has a sub-magnetic pole, the three pole stator tends to have a retaining force which is weaker than that of the two pole stator.

The polarities of the pulse are switched from each other multiple times during one rotation. Consequently, in view of a stable operation, a problem also arises in that the rotor has to be rotated while cancelling the residual magnetic flux generated in the region functioning as the "narrow portion" in the related art.

Therefore, similarly to the above-described case of the two pole stator, the Cr-diffusion region is formed in at least a portion of the magnetic path around the rotor accommodating through-hole, preferably in at least a portion of the region functioning as the "narrow portion" in the related art so as to reduce permeability in the region. In this manner, it is possible to realize the much faster hand operation by improving stability during the fast hand operation.

According to the stepping motor of the present invention, the Cr-diffusion region is formed in a portion of the magnetic path disposed around the rotor accommodating through-hole. Accordingly, the permeability can be considerably reduced in the region. As a result, the magnetic flux consumed in the region can be considerably reduced. Therefore, the magnetic leakage flux for driving the rotor can be efficiently secured, and power saving can be achieved.

According to the stepping motor of the present invention, since the permeability is reduced in the Cr-diffusion region, the magnetic flux generated from the rotor itself is also restrained from being consumed in the region, and it is possible to prevent loss of the magnetic potential. Therefore, it is possible to increase a retaining force for magnetically stopping and retaining the rotor, and it is possible to improve stability of the rotor which is rotatably driven. In particular, when the fast hand operation is performed, it is possible to shorten a period of time required for cancelling the residual magnetic flux in the region, and it is possible to increase driving frequencies.

Furthermore, according to the stepping motor of the present invention, the stator is integrally formed.

Accordingly, it is possible to avoid the occurrence of mechanical stress, distortion during a welding/joining process, or misalignment of members, which is a worrying factor when the dually integrated stator is manufactured in the related art. Therefore, it is possible to prevent magnetic inefficiency, damage to the stator, and poor quality products. Moreover, there is no welded portion or joined portion which is likely to receive concentrated mechanical stress. Therefore, it is possible to prevent strength from being weakened.

Although the stepping motor according to the present invention is applicable to various electronic devices which employ the stepping motor, it is particularly preferable to use the stepping motor for a timepiece movement. Therefore, it is possible to provide a timepiece movement which has excellent magnetic properties.

It is also possible to improve the magnetic properties for a timepiece including the timepiece movement. For example, the stepping motor is applicable to various analog electronic timepieces as well as analog electronic wrist watches provided with a calendar function and chronograph timepieces.

Next, a manufacturing method of the above-described stepping motor 105 will be described.

The manufacturing method of the stepping motor 105 according to the present embodiment includes machining a Fe—Ni alloy plate and forming a stator material 201*a* which has the rotor accommodating through-hole 203 and the magnetic path R arranged around the rotor accommodating through-hole 203, arranging a Cr-material for diffusion in at least a portion of the stator material 201*a*, and emitting a laser beam to the Cr-material, melting and solidifying the Cr-material into the magnetic path R, and forming the Cr-diffusion regions 210 and 211 therein.

Hereinafter, each condition of the manufacturing method according to the present embodiment will be described.

First, machining such as punching is performed on the Fe—Ni alloy plate so as to form the stator material having the rotor accommodating through-hole 203 and the magnetic path R arranged around the rotor accommodating through-hole 203. The cut-out portions (inner notches) 204 and 205 can also be formed in conjunction with this process.

When the narrow portions 213 and 214 are disposed by forming the cut-out portions (outer notches) 206 and 207 (refer to FIG. 6), the cut-out portions 206 and 207 may be formed in conjunction with this process.

As the stator material 201*a*, it is preferable to use the Fe—Ni alloy which has high permeability. For example, it is possible to use Cr containing Fe of 38% and Ni of 8% (so called 38 permalloy).

Next, the Cr-material for diffusion is arranged in at least a portion of the stator material 201*a*. The Cr-material is melted and diffused into the magnetic path R by emitting the laser beam to the Cr-material so as to form the Cr-diffusion regions 210 and 211.

At least a portion of the magnetic path may be coated with a paste containing powdered metallic chromium, and the paste may be melted and diffused by emitting the laser beam to the paste. Alternatively, a chromium plating layer may be formed in advance on a surface of the stator material 201*a*, and the Cr-material may be melted and diffused by emitting the laser beam to the chromium plating layer formed in at least a portion of the magnetic path R, within the chromium plating layer formed on the surface of the stator material 201*a*. In view of applicability in a state where the stator base material is covered with plating, a mass ratio of Cr for the plating does not exceed 80%. Alternatively, instead of the above-described paste, powder may be used.

Figure 7A:
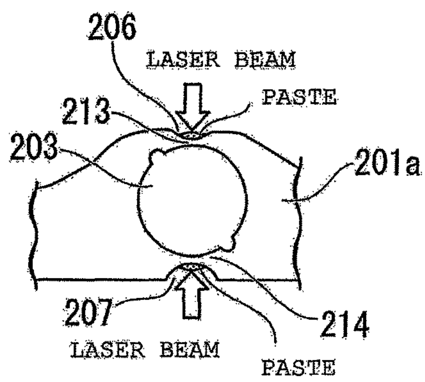
FIGS. 7A and 7B are schematic views for describing a manufacturing method of the stepping motor according to the present embodiment.
Figure 7B:
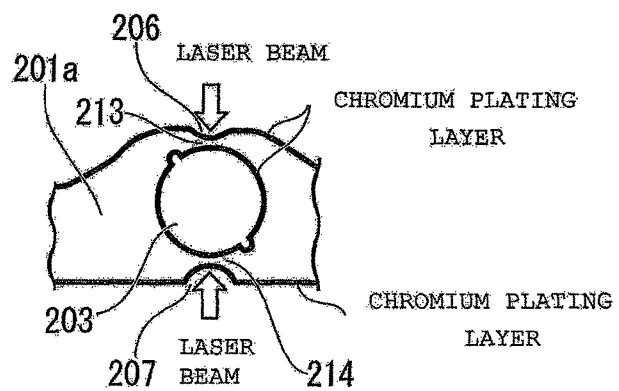

When the narrow portions 213 and 214 are disposed (refer to FIG. 6), the above-described paste or chromium plating layer may be formed in the cut-out portions (outer notches) 206 and 207 as illustrated in FIGS. 7A and 7B.

A laser emitting condition when the Cr-material is melted for diffusion is not particularly limited, and may be properly adjusted so as to realize a desired Cr-diffusion region.

Next, the stator 201 is obtained by forming the Cr-diffusion regions 210 and 211. Thereafter, the rotor 202 is arranged inside the rotor accommodating through-hole 203. The magnetic core 208 is fixed by the stator 201 and any desired fixing means, and the coil 209 is wound around the magnetic core 208. In this manner, the stepping motor 105 can be manufactured.

When the stepping motor 105 is used for the analog electronic timepiece, the stator 201 and the magnetic core 208 are fixed to a main plate (not illustrated) by using screws (not illustrated).

According to the above-described manufacturing method, it is possible to manufacture the stepping motor 105 according to the present embodiment.

Here, a melted state and Cr content depending on a difference in processing conditions were investigated in the Cr-diffusion regions 210 and 211.

Figure 8:
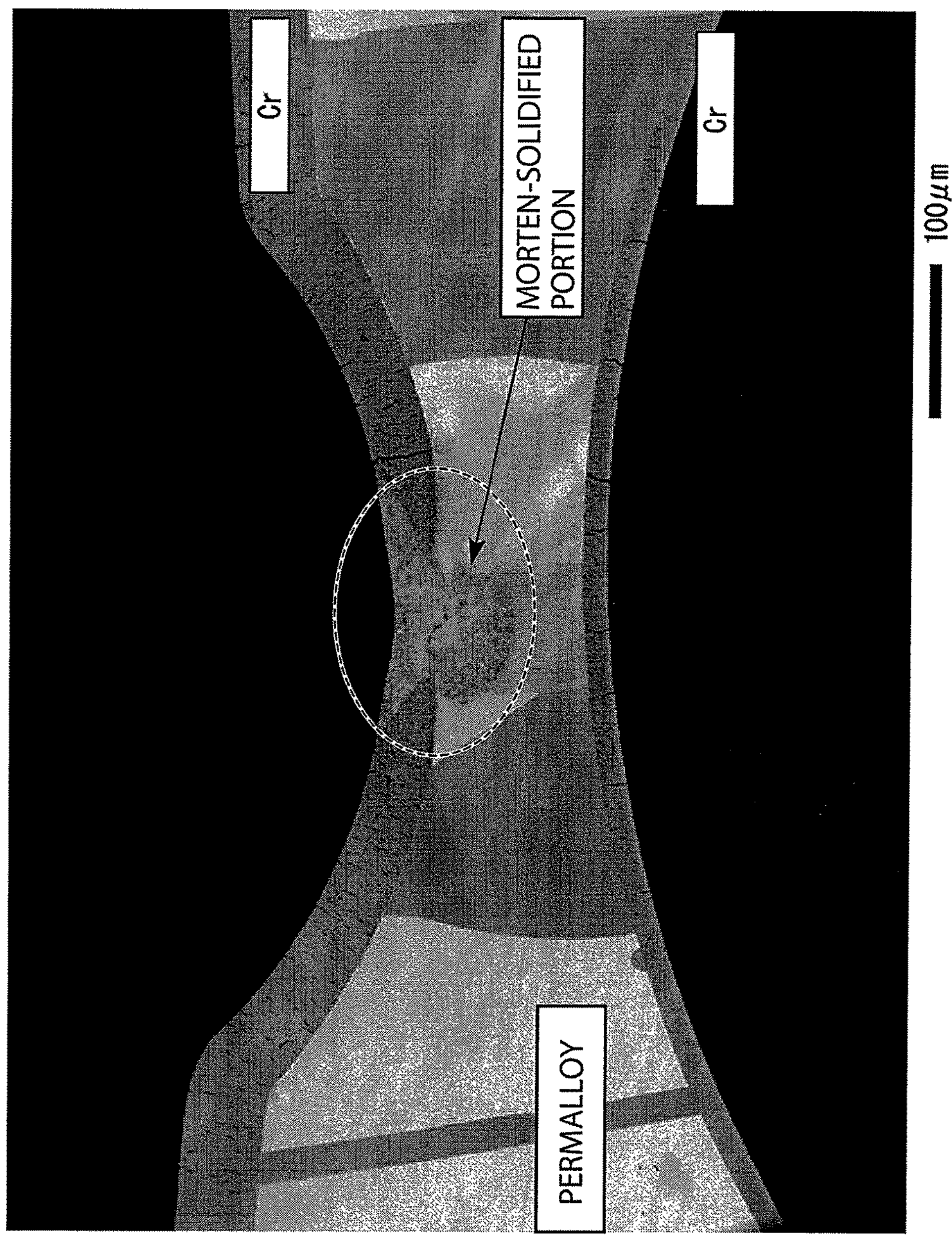
FIG. 8 is a scanning electron microscope (SEM) image in a cross section perpendicular to the thickness direction of Cr-diffusion regions in Example #2.
Figure 9:
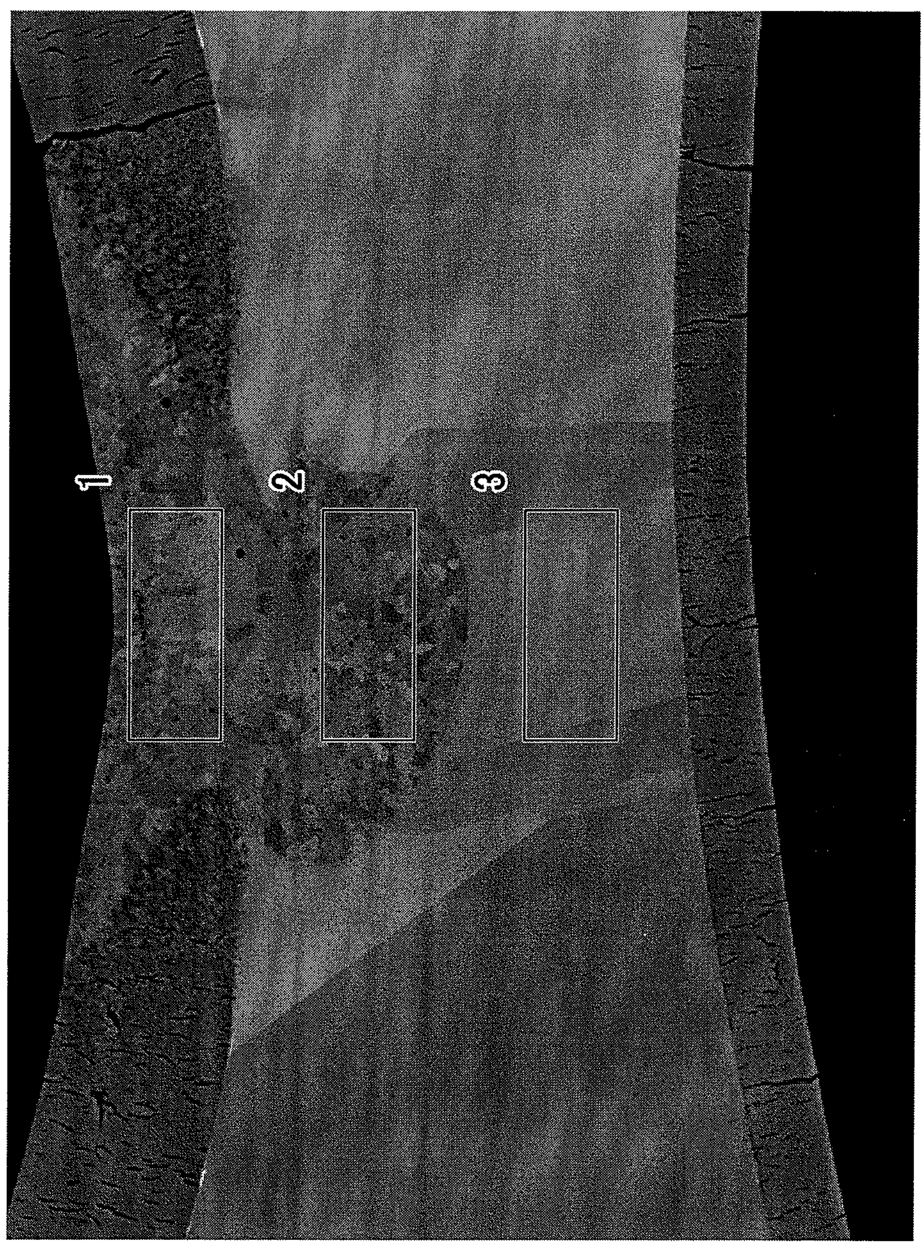
FIG. 9 is a partially enlarged view of the scanning electron microscope image illustrated in FIG. 8.

FIG. 8 is a scanning electron microscope (SEM) image in a cross section perpendicular to the thickness direction (direction parallel to the paper surface in FIGS. 4A and 4B) of Cr-diffusion regions 210 and 211 in Example #2 (0.6 J). FIG. 9 is a partially enlarged view of the scanning electron microscope image illustrated in FIG. 8. In FIG. 9, regions 1, 2, and 3 surrounded by square lines correspond to the upper side 1, the center 2, and the lower side 3 in Table 1.

First, cross-section polisher (CP) processing was performed on an observation-target portion in the Cr-diffusion regions 210 and 211 by using IB-09020CP (product name) manufactured by JEOL Ltd. An acceleration voltage was 7 kV.

Energy Dispersive x-ray Spectroscopy (EDS) was performed on these regions 1, 2, 3, and the base material (region where Cr is not diffused by melting Cr). Results are shown in Table 1.

As the scanning electron microscope, a field emission-type scanning electron microscope (FE-SEM) (product name: IB-09020CP, manufactured by JEOL Ltd) was used. The acceleration voltage was 15 kV.

An EDS mapping analysis was performed using NORAN STSTEM 7 (product name) manufactured by Thermo Fisher Scientific Inc. The acceleration voltage was 5 kV.

Figure 10:
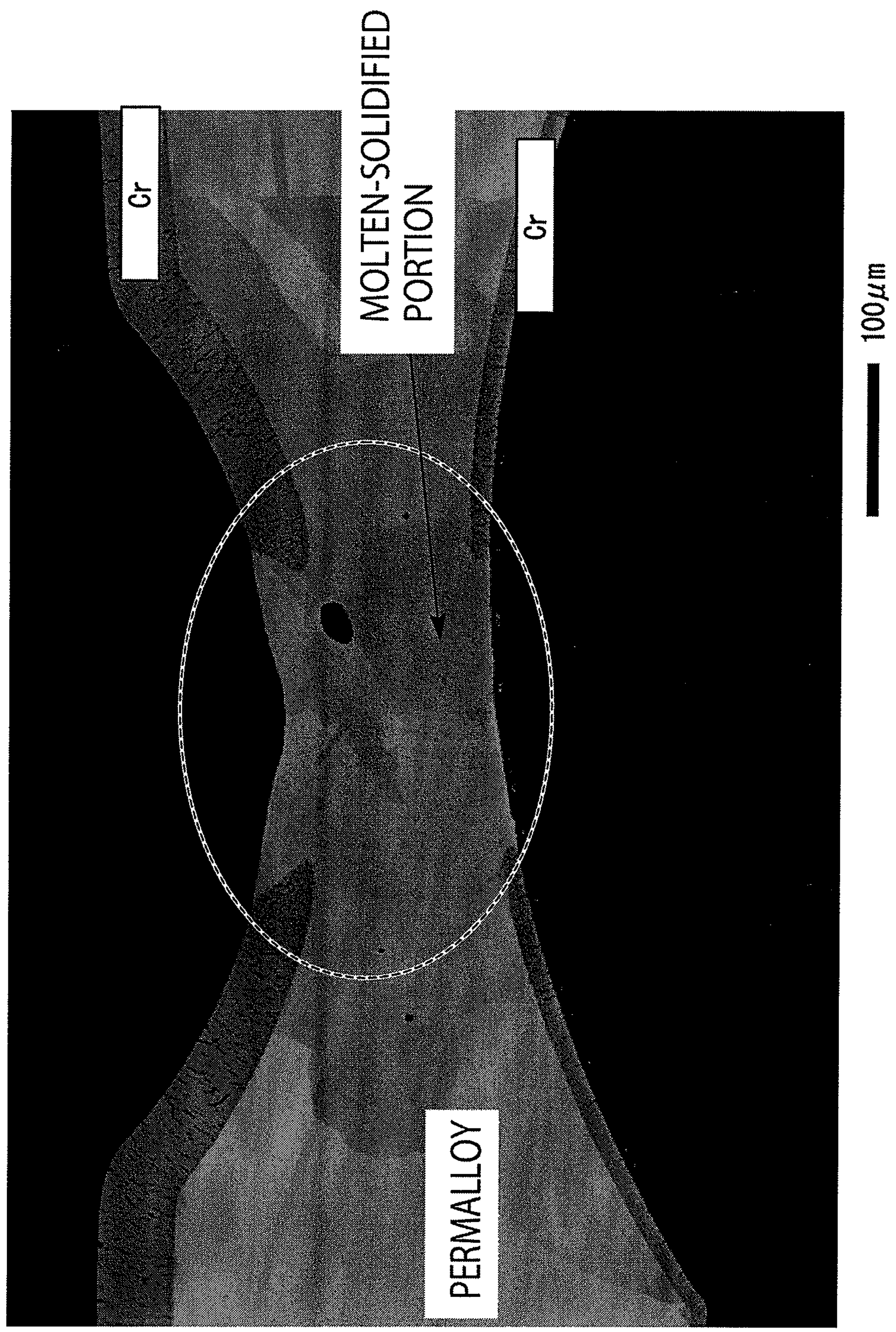
FIG. 10 is a scanning electron microscope (SEM) image in the cross section perpendicular to the thickness direction of the Cr-diffusion regions in Example #4.
Figure 11:
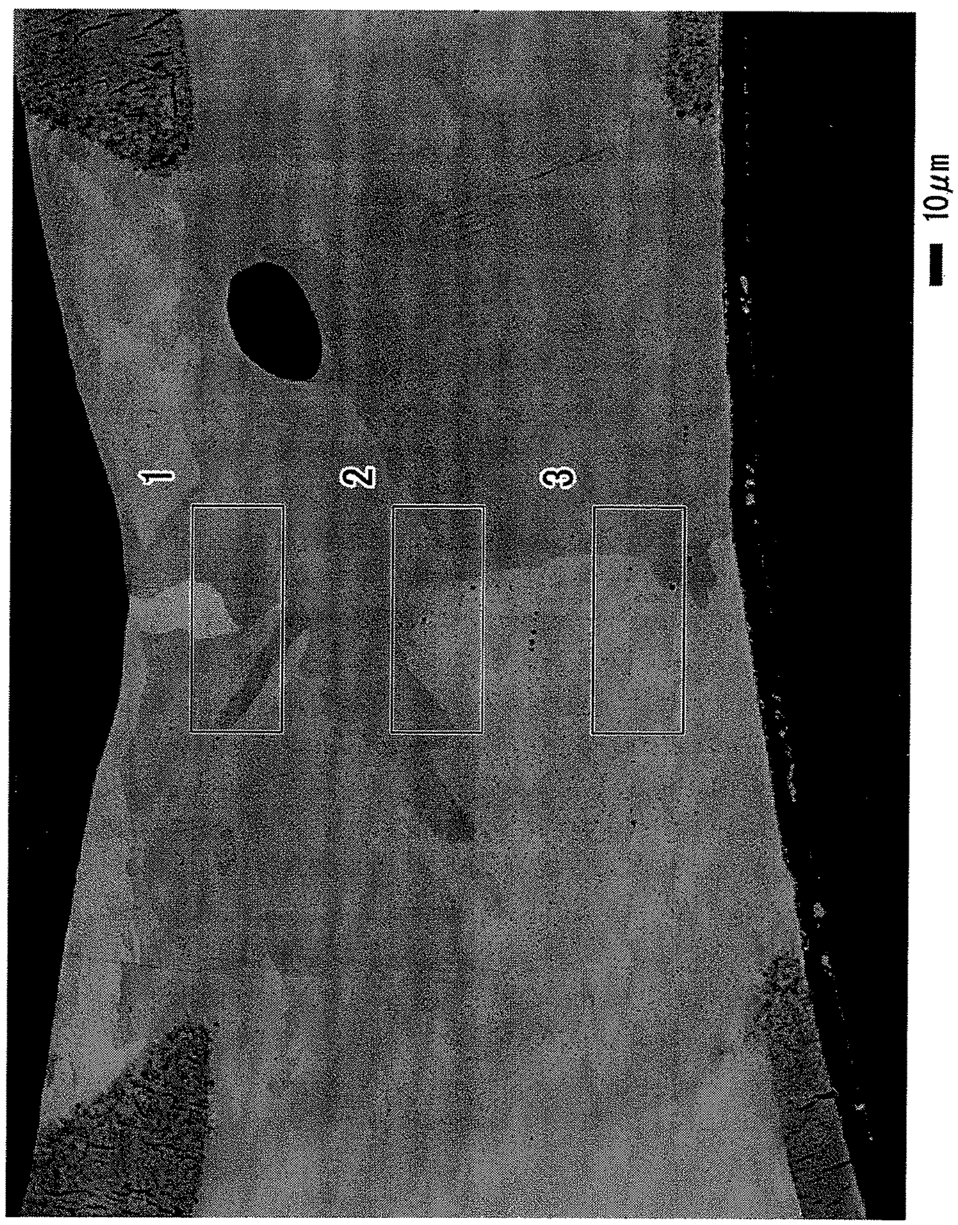
FIG. 11 is a partially enlarged view of the scanning electron microscope image illustrated in FIG. 10.

FIG. 10 is a scanning electron microscope (SEM) image in a cross section perpendicular to the thickness direction (direction parallel to the paper surface in FIGS. 4A and 4B) of the Cr-diffusion regions 210 and 211 in Example #4 (1.0 J). FIG. 11 is a partially enlarged view of the scanning electron microscope image illustrated in FIG. 10. In FIG. 11, regions 1, 2, and 3 surrounded by square lines correspond to the upper side 1, the center 2, and the lower side 3 in Table 1.

Similarly to Example #2 (0.6 J), the EDS analysis was performed on these regions 1, 2, 3, and the base material (region where Cr is not diffused by melting Cr). Results are shown in Table 1.

Figure 12:
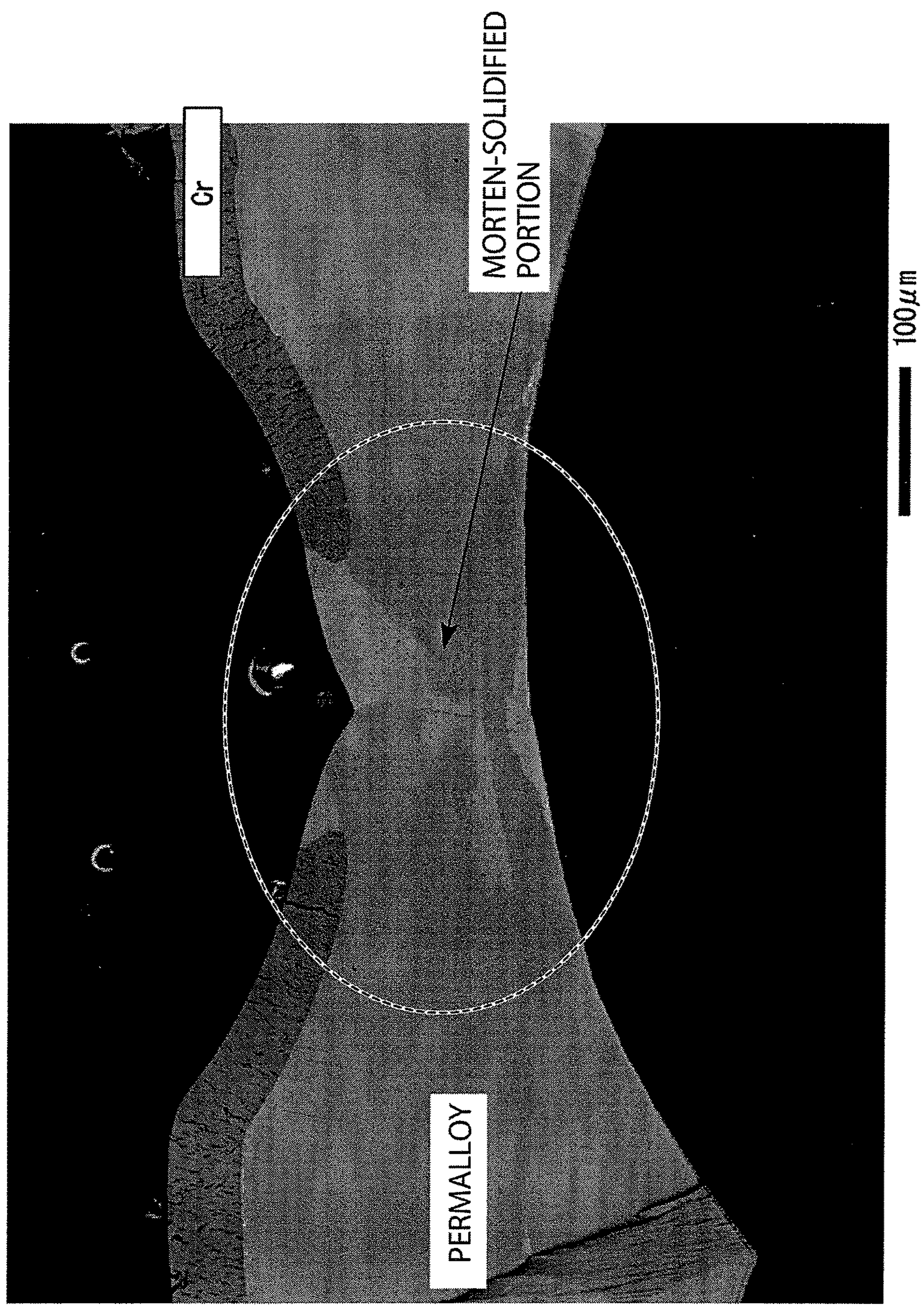
FIG. 12 is a scanning electron microscope (SEM) image in a cross section perpendicular to the thickness direction (direction parallel to the paper surface in FIGS. 4A and 4B) of the Cr-diffusion regions in Example #6.
Figure 13:
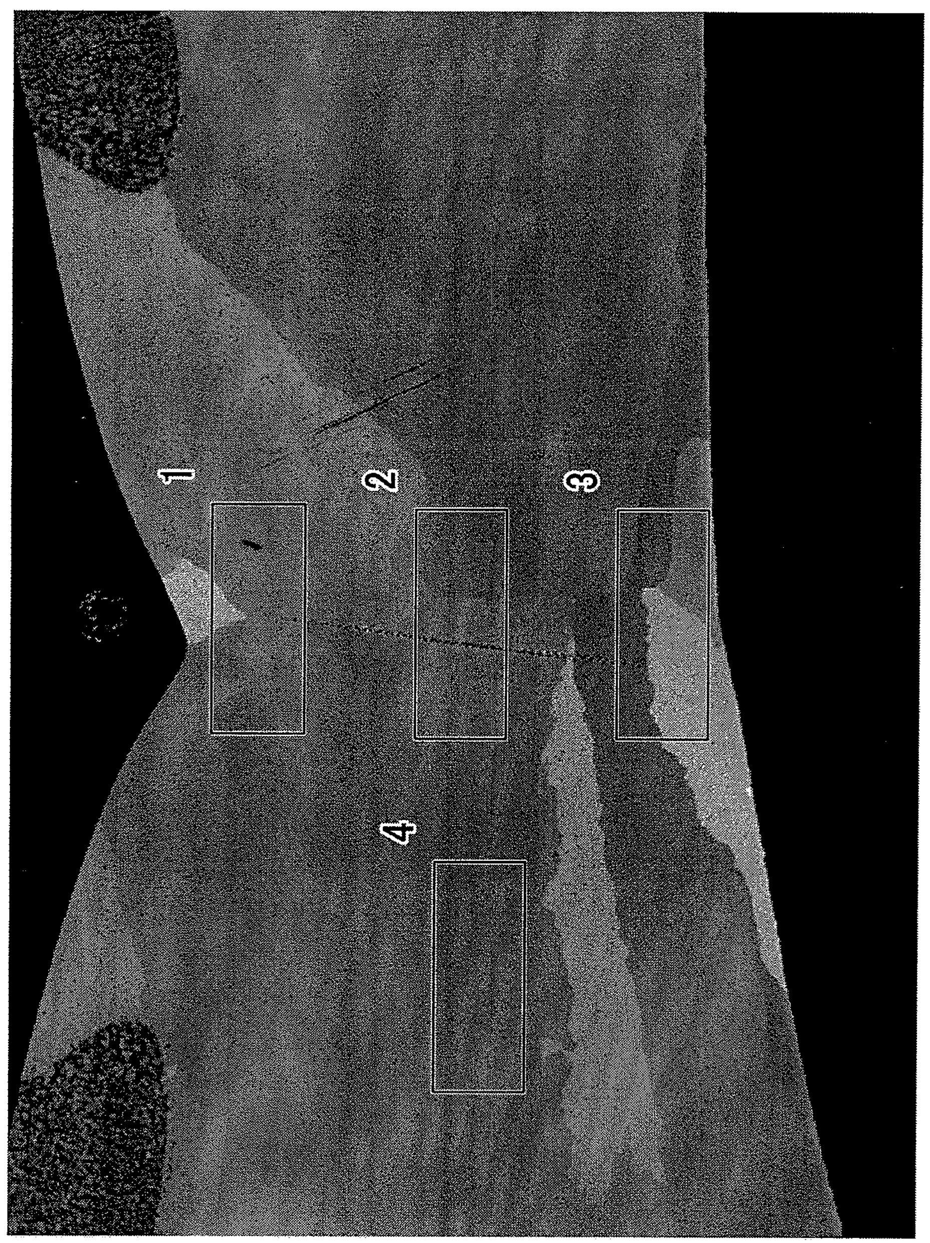
FIG. 13 is a partially enlarged view of the scanning electron microscope image illustrated in FIG. 12.

FIG. 12 is a scanning electron microscope (SEM) image in a cross section perpendicular to the thickness direction (direction parallel to the paper surface in FIGS. 4A and 4B) of the Cr-diffusion regions 210 and 211 in Example #6 (1.4 J). FIG. 13 is a partially enlarged view of the scanning electron microscope image illustrated in FIG. 12. In FIG. 13, regions 1, 2, 3, and 4 surrounded by square lines correspond to the upper side 1, the center 2, the lower side 3, and the outer peripheral portion 4 in Table 1.

Similarly to Example #2 (0.6 J), the EDS analysis was performed on these regions 1, 2, 3, 4, and the base material (region where Cr is not diffused by melting Cr). Results are shown in Table 1.

TABLE 1

| | Measured Location | Detection Element and Quantitative Conversion Value (mass %) | | | | | | |
|---|---|---|---|---|---|---|---|---|
| | | C | O | Al | Si | Cr | Fe | Ni |
| #2 | Upper Side of Welded Portion 1 | 3.13 | 0.65 | 0.16 | 0.12 | 48.19 | 27.39 | 20.36 |
| | Center of Welded Portion 2 | 3.16 | 0.69 | 0.16 | 0.11 | 53.02 | 24.57 | 18.29 |
| | Lower side of Welded Portion 3 | 2.83 | 0.00 | 0.16 | 0.14 | 7.57 | 52.39 | 36.90 |
| | Base material | 2.64 | 0.00 | 0.15 | 0.16 | 7.54 | 52.33 | 37.18 |
| #4 | Upper Side of Welded Portion 1 | 2.40 | 0.00 | 0.18 | 0.12 | 24.18 | 42.99 | 30.13 |
| | Center of Welded Portion 2 | 2.46 | 0.00 | 0.23 | 0.12 | 28.46 | 40.18 | 28.55 |
| | Lower side of Welded Portion 3 | 2.67 | 0.00 | 0.19 | 0.15 | 28.99 | 39.65 | 28.35 |
| | Base material | 2.25 | 0.00 | 0.19 | 0.12 | 7.46 | 53.12 | 36.86 |
| #6 | Upper Side of Welded Portion 1 | 2.93 | 0.00 | 0.19 | 0.16 | 18.05 | 46.15 | 32.52 |
| | Center of Welded Portion 2 | 2.84 | 0.00 | 0.23 | 0.14 | 18.28 | 45.33 | 33.18 |
| | Lower side of Welded Portion 3 | 2.80 | 0.00 | 0.19 | 0.10 | 19.18 | 45.32 | 32.41 |
| | Outer Peripheral Portion of Welded Portion 4 | 2.78 | 0.00 | 0.20 | 0.14 | 18.34 | 45.72 | 32.82 |
| | Base material | 2.65 | 0.00 | 0.23 | 0.16 | 7.52 | 52.39 | 37.05 |

The results in Table 1 confirmed that the Cr-diffusion regions 210 and 211 contain Cr, Fe, and Ni as main components and contain C, O, Al, and Si as minor components.

The results in Table 1 confirmed that the Cr-diffusion regions 210 and 211 formed by emitting the laser beam have Cr content which is higher than that of the base material.

Based on the above-described results, the Cr-diffusion regions 210 and 211 form a low permeability region.

According to the above-described configuration, when the magnetic flux is alternately and continuously applied from both pole sides of the anode and the cathode to the so-called narrow portion (vicinity of a portion having a minimized cross-sectional area around the rotor accommodating through-hole), the mass concentration (mass %) of Cr for forming the narrow portion as a molten-solidified portion is set to 15 mass % to 80 mass %. In this manner, it is possible to reduce the residual magnetic flux remaining due to the preceding magnetic flux operation. Then, the time required for cancelling the residual magnetic flux is shortened, and it is possible to shorten the time needed until the rotation of the rotor is converged. Accordingly, it is possible to facilitate drive control for the subsequently continued rotation. Therefore, for example, when the fast hand operation is performed, it is possible to increase driving frequencies while a stable operation can be maintained.

The residual magnetic flux can be reduced to substantially zero by setting the lower limit of the mass concentration of Cr in the so-called narrow portion to approximately 18% to 20% illustrated in Example #6, for example. It is also possible to minimize the time required for cancelling the residual magnetic flux. In this manner, for example, even at a high driving frequency of approximately 256 Hz, a stable operation can be achieved.

The residual magnetic flux can be reduced by setting the upper limit of the mass concentration of Cr in the so-called narrow portion to approximately 45% to 55% illustrated in Example #2, for example. The time required for cancelling the residual magnetic flux can be reduced to a negligible level in the fast hand operation, and the amount of Cr coating (including the plating) can be minimized to a practical range. In this manner, it is possible to provide the stepping motor which can perform a more feasible fast hand operation.

According to the manufacturing method of the stepping motor in the present invention, the stator is integrally formed. Accordingly, there is no possibility of mechanical stress due to cutting, distortion during a welding/joining process, or misalignment of members. Therefore, it is possible to prevent magnetic inefficiency, damage to the stator, poor quality products, and weakened strength. Moreover, the Cr-diffusion region is formed in at least a portion of the magnetic path, thereby reducing the permeability. Therefore, it is possible to easily manufacture the stepping motor which not only realizes power saving but also has a high retaining force.

When the low permeability region is adjusted, the related art not only needs a lot of processes in processing methods or conditions of mechanically dividing the stator and adjustment of a non-magnetic material to be inserted, but also has to change or adjust many manufacturing conditions. As a result, there is a possibility of an increase in the manufacturing cost. However, according to the present invention, the stator material does not need processing such as cutting. The Cr-diffusion region (low permeability region) can be desirably adjusted only by adjusting a condition for emitting the laser beam.

What is claimed is:

1. A stepping motor comprising:

a one-piece stator comprised of Fe—Ni alloy, the stator having a rotor accommodating through-hole and defining a magnetic path around the rotor accommodating through-hole;

a rotor rotatably arranged inside the rotor accommodating through-hole;

a magnetic core connected to the stator; and a coil wound on the magnetic core, wherein a Cr-diffusion region having a molten-solidified portion of Cr is diffused in the Fe—Ni alloy stator in a portion of the magnetic path.

2. The stepping motor according to claim 1, wherein the stator has a narrow portion where a cross-sectional area of the magnetic path is narrower than that of other portions, and the Cr-diffusion region is diffused in at least a portion of the narrow portion.

3. The stepping motor according to claim 2, wherein the molten-solidified portion includes the narrow portion, and is disposed in a section which does not interfere with a cut-out portion disposed in the rotor accommodating through-hole in order to secure a stable position of the rotor.

4. The stepping motor according to claim 1, wherein the Cr-diffusion region contains 15 mass % to 80 mass % of Cr.

5. The stepping motor according to claim 4, wherein the Cr-diffusion region contains 18 mass % to 55 mass % of Cr.

6. A timepiece movement comprising:

the stepping motor according to claim 1; and a hand that is rotated by the stepping motor so as to indicate time.

7. A timepiece comprising:

the timepiece movement according to claim 6.

8. A manufacturing method of a stepping motor according to claim 1 comprising:

machining a Fe—Ni alloy plate to form a stator having a rotor accommodating through-hole and a magnetic path arranged around the rotor accommodating through-hole;

arranging a Cr-material for diffusion in at least a portion of the stator; and emitting a laser beam to the Cr-material, melting and solidifying the Cr-material into the magnetic path, and forming a Cr-diffusion region having a molten-solidified portion of Cr.

9. The manufacturing method of the stepping motor according to claim 8, wherein the arranging of the Cr-material comprises coating at least a portion of the magnetic path with a paste containing powdered metallic chromium.

10. The manufacturing method of the stepping motor according to claim 8, wherein the arranging of the Cr-material comprises forming a chromium plating layer on a surface of the stator, and wherein in the melting of the Cr-material, the Cr-material is melted by emitting the laser beam to the chromium plating layer formed in at least a portion of the magnetic path, within the chromium plating layer formed on the surface of the stator.

11. The manufacturing method of the stepping motor according to claim 8, wherein in the forming of the stator, a narrow portion in which a cross-sectional area of the magnetic path is narrower than that of other portions is disposed in the stator, and wherein in the arranging of the Cr-material, the Cr-material is arranged in a region including at least the narrow portion.

* * * * *